United States Patent [19]
Adams, Jr.

[11] Patent Number: 5,766,459
[45] Date of Patent: Jun. 16, 1998

[54] INTEGRATED WASTEWATER TREATMENT SYSTEM WITH INDUCED SLUDGE VELOCITY

[75] Inventor: Carl E. Adams, Jr., 201 Summit View Dr., Suite 313, Brentwood, Tenn. 37027

[73] Assignee: Carl E. Adams, Jr., Brentwood, Tenn.

[21] Appl. No.: 599,600

[22] Filed: Feb. 8, 1996

[51] Int. Cl.$^6$ ....................................................... C02F 3/20
[52] U.S. Cl. ..................... 210/195.4; 210/202; 210/256; 210/258; 210/626
[58] Field of Search ............................. 210/195.1, 195.3, 210/195.4, 220, 258, 259, 626, 202, 256

[56] References Cited

U.S. PATENT DOCUMENTS

| | | |
|---|---|---|
| 1,009,857 | 11/1911 | Reisert . |
| 1,962,430 | 6/1934 | Currie . |
| 2,195,408 | 4/1940 | Downes . |
| 2,540,474 | 2/1951 | Cox . |
| 2,574,685 | 11/1951 | Baxter et al. ............................ 210/626 |
| 2,889,929 | 6/1959 | Kivell . |
| 3,053,390 | 9/1962 | Wood . |
| 3,195,727 | 7/1965 | Kibbee ................................ 210/195.4 |
| 3,355,023 | 11/1967 | Foster ................................. 210/195.4 |
| 3,385,444 | 5/1968 | Dufournet ............................. 210/195.4 |
| 3,883,427 | 5/1975 | Oldham et al. ....................... 210/195.4 |
| 4,390,422 | 6/1983 | Mackrle et al. ...................... 210/195.4 |
| 5,549,818 | 8/1996 | McGrew, Jr. ........................... 210/220 |

OTHER PUBLICATIONS

By United Industries, Inc., "The Boat Clarifier", Publication No. 988BC, pp. 1–10, Date Unknown.
By Mixing Equipment Co., Inc., "Lightnin Treatment Systems", 1977.
By Hoechst, "The Biotech Reactor State of the Art in Biological Waste Water Treatment" Brochure 8708/035E, Date Unknown.
By Unknown, "Paper Mill Cleans Up Hard–Working River", *Engineering News–Record*, pp. 24–26, Aug. 1, 1963.

Primary Examiner—Christopher Upton
Attorney, Agent, or Firm—Daniel V. Thompson

[57] ABSTRACT

An integral activated sludge wastewater treatment system has a vessel having at least one internal baffle dividing the vessel into at least one treatment chamber and at least one settling chamber. The settling chamber is at least partially defined by a first wall of the baffle. The treatment chamber is at least partially defined by a second wall of the baffle. A recycle pump is provided for recycling aerated wastewater from the treatment chamber back into the settling chamber and inducing a downward sludge velocity in excess of the velocity that would be caused by gravity alone.

6 Claims, 6 Drawing Sheets

INTEGRATED WASTEWATER TREATMENT SYSTEM WITH INDUCED SLUDGE VELOCITY

TECHNICAL FIELD

This invention relates to wastewater treatment systems, and more particularly to a system having a vessel with integral treatment and settling chambers.

DESCRIPTION OF THE PRIOR ART

Figure 1:
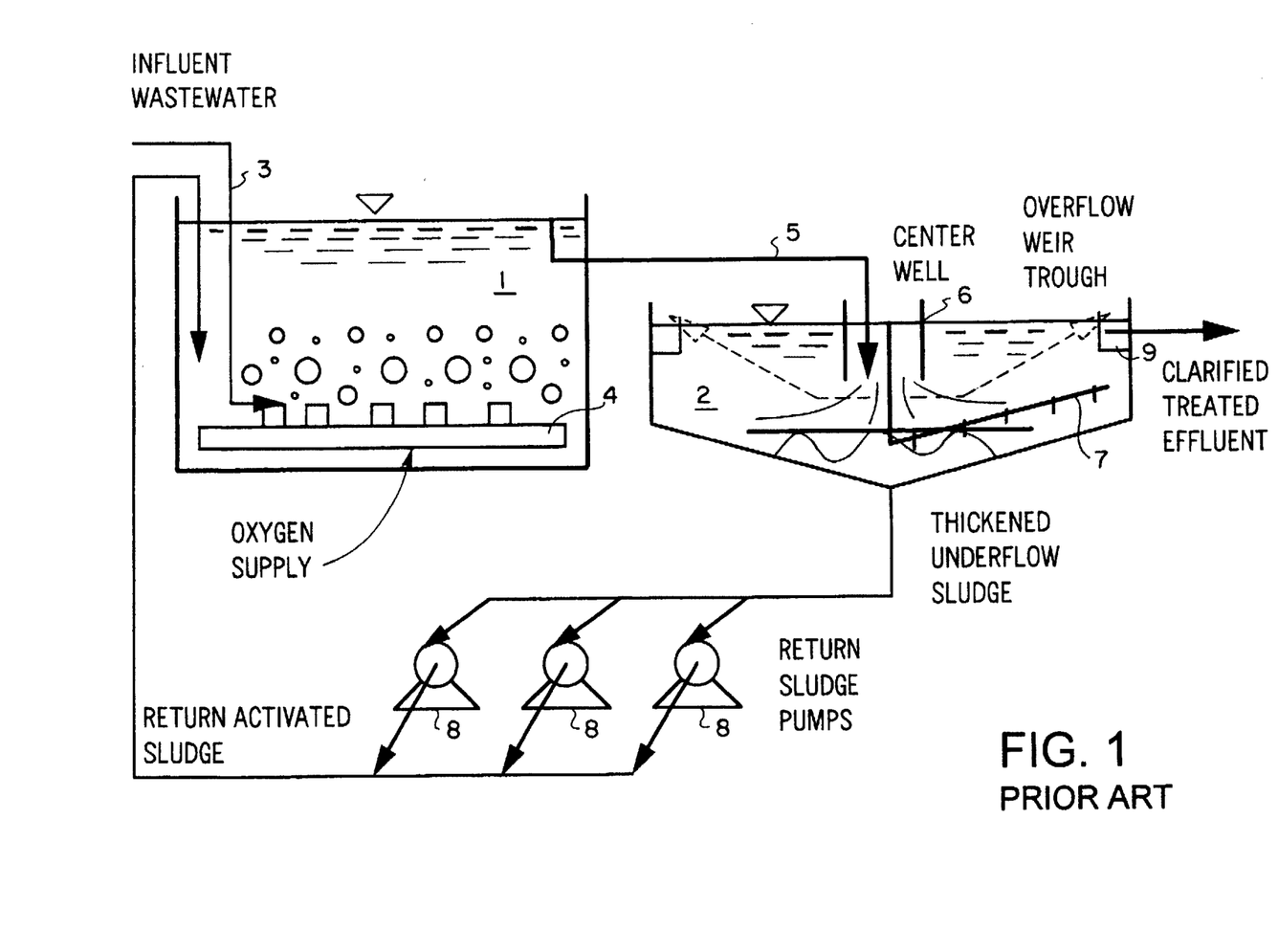
FIG. 1 is schematic view of a prior art activated sludge system.

One commonly used wastewater treatment system uses what is known as the "activated sludge" process. The conventional activated sludge process consists of at least one treatment (typically by aeration) basin and at least one separate, secondary treatment sludge settling, or "clarification", system. FIG. 1 is an illustration of a typical conventional system in its simplest form, consisting, by way of example, of a rectangular aeration basin 1 and a circular, center-feed clarifier 2. Influent wastewater enters basin 1 at conduit 3, where it is aerated by aeration system 4. Biological processes treat the water in basin 1 by converting organic pollutants to a stable, odorless and harmless solid known as "activated sludge". The effluent from basin 1 is conducted to clarifier 2 by way of conduit 5. Conduit 5 empties into the center well 6 of the clarifier. Sludge settles out of the water by way of gravity and is conveyed to the center by scraper arms 7. Pumps 8 return and recycle at least a portion of the thickened underflow sludge to the aeration basin 1 to maintain the biological treatment process. Clarified, treated effluent is taken from clarifier 2 at effluent overflow weir 9.

The clarifier 2 has proven to be a critical link in the operating success of the activated sludge system. The clarifier must serve four major functions:

1. Provide adequate surface area and quiescent settling conditions, both horizontally and vertically within the clarifier, to allow horizontal separation of the biomass sludge from the treated effluent wastewater.

2. Provide residence time and bottom surface area adequate to allow the settling sludge to thicken, such that return recycle rates are sufficiently low to prevent unnecessary underflow currents in the clarifier.

3. Provide a reliable method of sludge withdrawal that will minimize short-circuiting of diluted sludge and permit withdrawal of optimally concentrated material.

4. Allow rapid withdrawal of sludge to minimize anoxic/septic conditions which may result in dentrification within the clarifier or odors in the sludge handling area.

In addition to these operational hindrances, the conventional clarifier, such as clarifier 2 in FIG. 1, has been burdened with economic constraints, including:

1. Continuously-operated, on-line return activated sludge pumps 8, which are high maintenance and high energy consumers.

2. An internal clarifier mechanism 7 to collect and remove the settled sludge, either by movement to the center for pumping, or by hydraulic, siphon take-off methods.

3. An independent structural unit, capable of containing water depths up to 3 to 5 meters (12 to 16 ft).

There have been several attempts to address these drawbacks of the conventional activated sludge system by integrating the aeration basin and clarifier into a single unit. These endeavors have tried unsuccessfully to incorporate or attempt to suspend the clarifier inside or attached to the aeration basin.

For example, the "Boat Clarifier" attempted to suspend the clarifier within an oxidation ditch. The Boat Clarifier suffered from numerous drawbacks, such as total dependence on gravity to recirculate sludge. In practice the sludge has frequently piled up in the bottom of the clarifier.

Another attempt to use an integral aeration basin and clarifier was the "Lightnin" treatment system. In this system, a clarifier and an aeration basin shared a common side wall, with an opening at the bottom of the side wall to transfer settled sludge back to the aeration basin. A significant drawback of this system is the requirement for a mechanical sludge wiping system. No recycle pump or induced sludge velocities were present. In practice, sludge would pile up in the clarifier and in most cases has had to be pumped.

The "BIOHOCH" and "BIOTOWER" reactors are also prior integral wastewater treatment systems. A peripheral final clarifier surrounds an aeration chamber in one version of the system. An elaborate mechanical sludge scraping mechanism is required, and there is no recycle pump to induce sludge velocities.

Finally a plant built in Whippany, N.J. described in the Aug. 1, 1963 Engineering News-Record had an integrated treatment and settling system, but no induced sludge velocities by a recycle pump were utilized to prevent sludge build ups.

Basically, these prior art efforts have been either technically or economically inadequate.

SUMMARY OF THE INVENTION

The present invention eliminates the drawbacks of the prior attempts to integrate an aeration chamber and a settling basin into a unitary structure, by carefully establishing specific flows of water and sludge through the system. Specifically, downward velocity of sludge through the settling chamber is induced by providing a pump to transfer liquid from the aeration chamber to the settling basin, as opposed to relying solely on gravity to settle the solids. A horizontal sweep velocity is induced at the bottom of the treatment vessel to sweep sludge from the sludge return opening between the two chambers. The induced velocities prevent sludge buildups and maintain efficient settling characteristics by having the induced sludge velocity being aligned with the influent flow to the clarifier.

BRIEF DESCRIPTION OF THE DRAWINGS

A more complete understanding of the invention and its advantages will be apparent from the Detailed Description taken in conjunction with the accompanying Drawings, in which.

DETAILED DESCRIPTION OF THE PREFERRED EMBODIMENT

Figure 2:
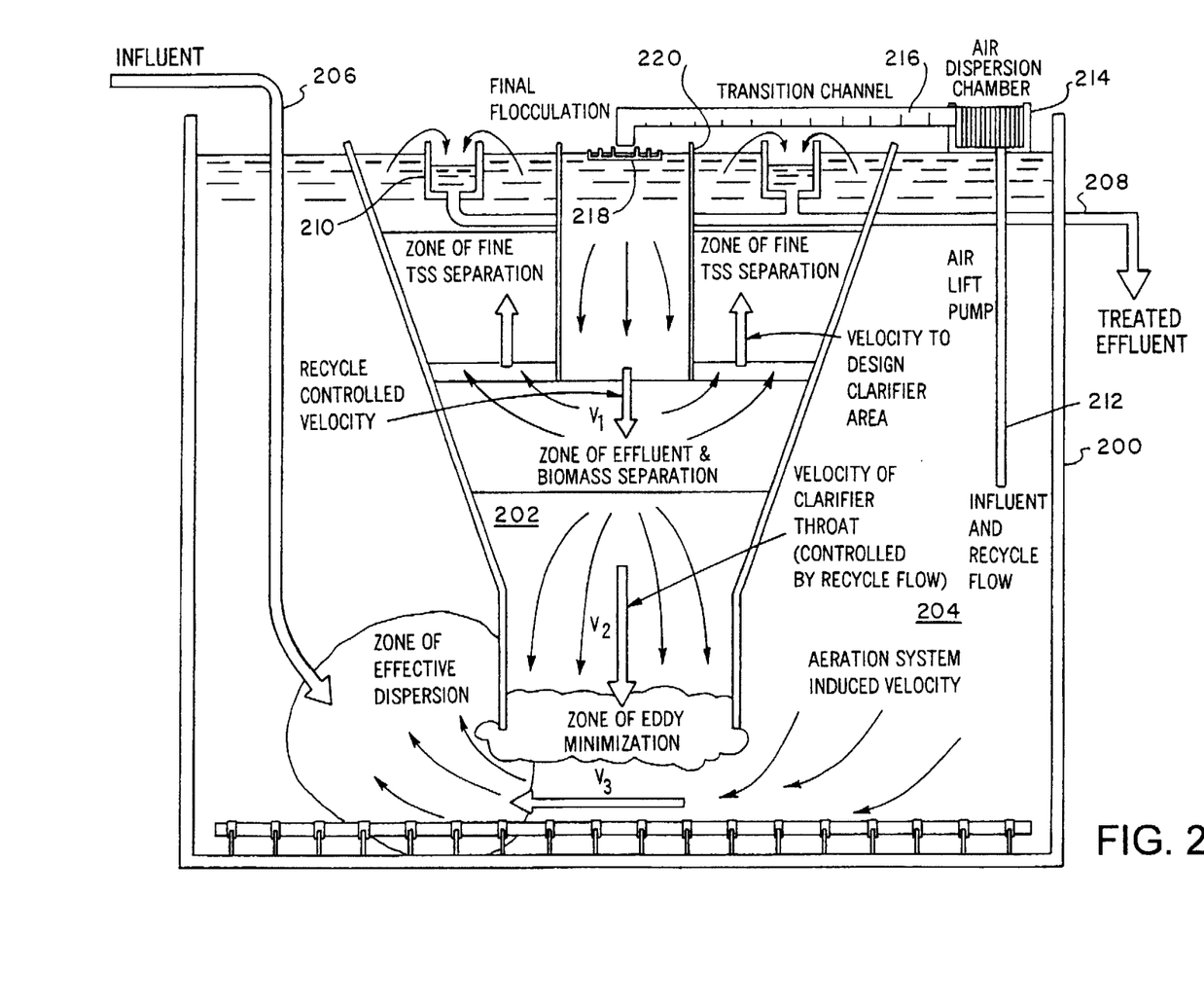
FIG. 2 is a schematic view of an integral activated sludge system constructed in accordance with the invention.
Figure 3:
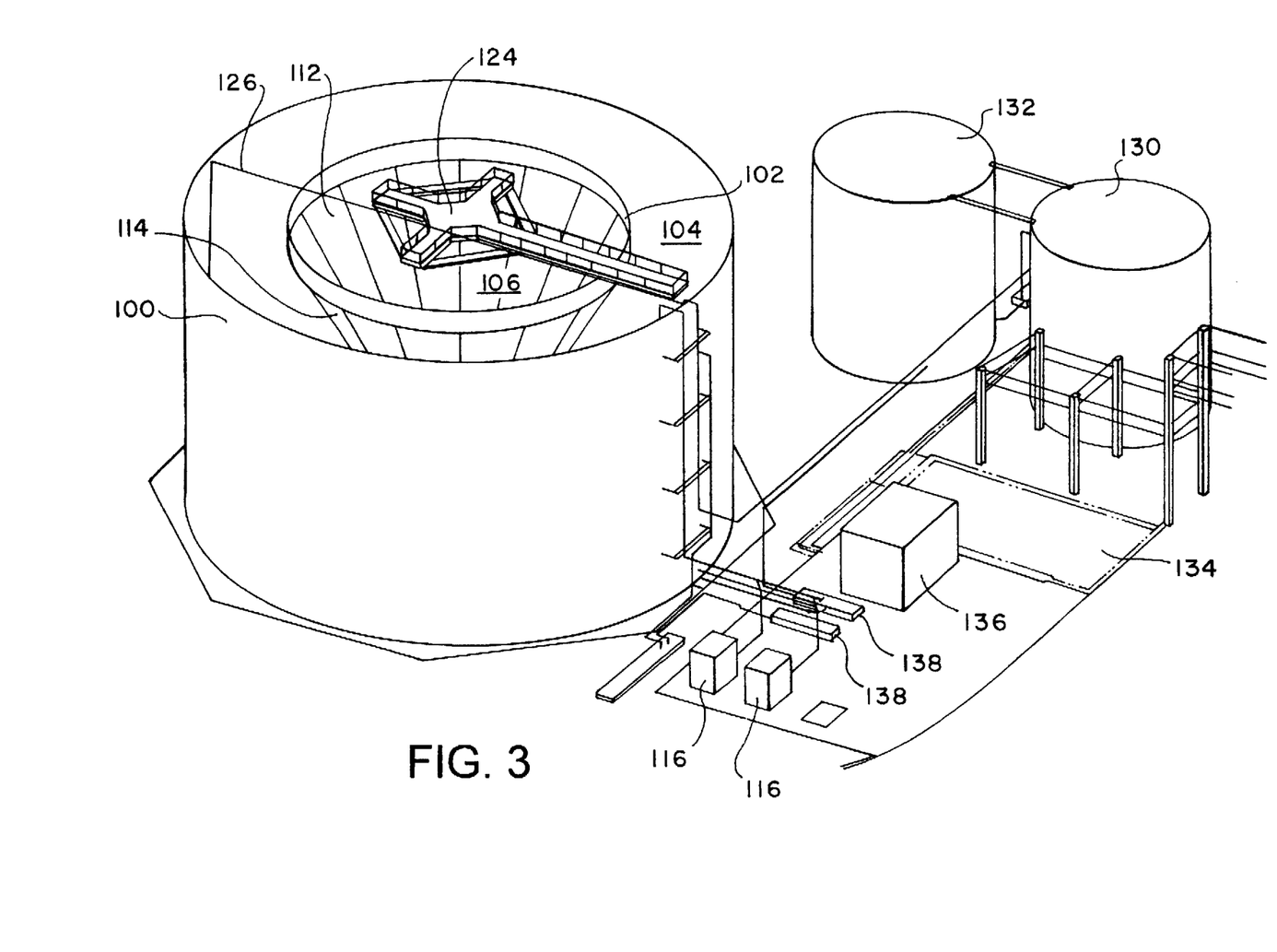
FIG. 3 is a detailed perspective view of an activated sludge system constructed in accordance with the invention.
Figure 4:
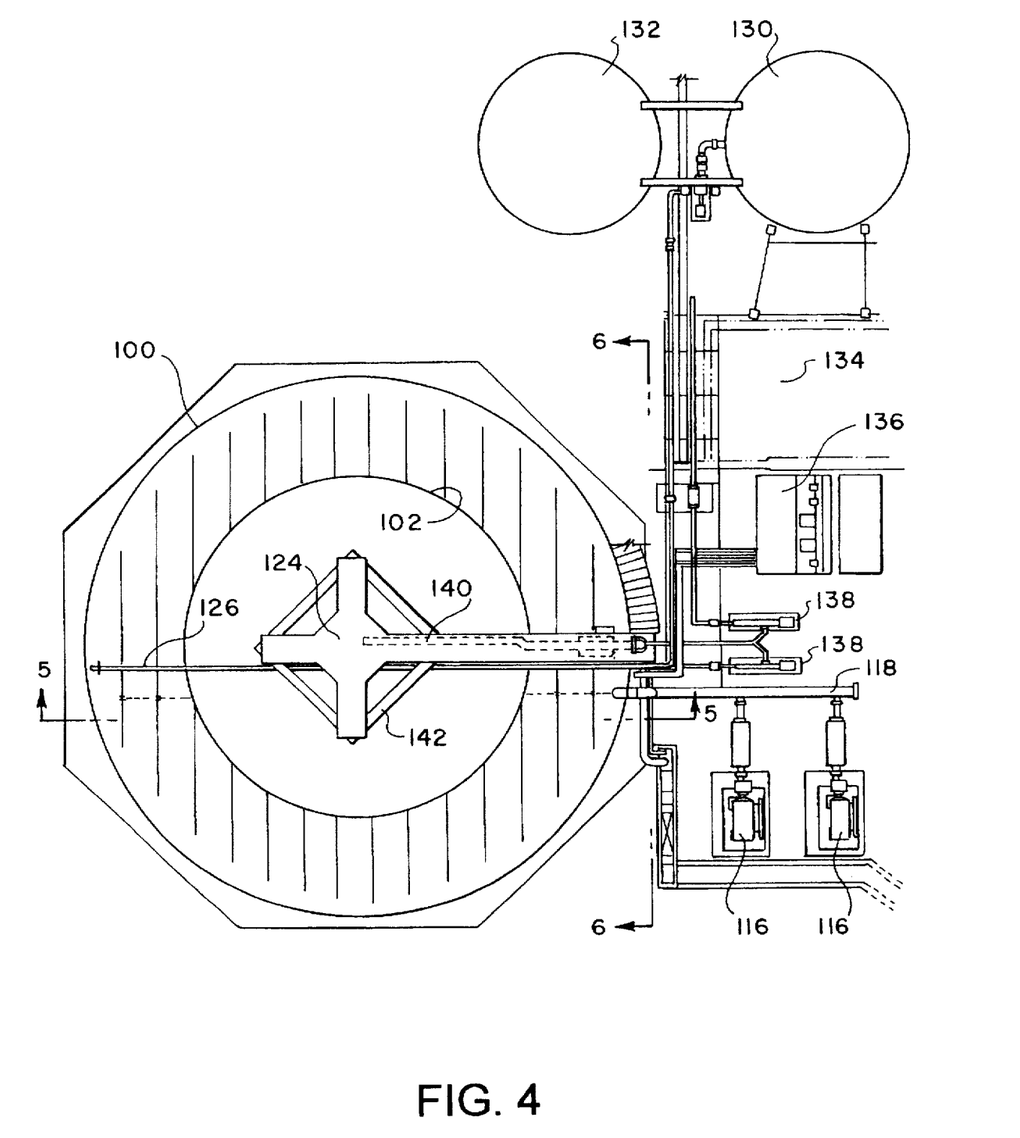
FIG. 4 is a top view of the system of FIG. 3.

Referring initially to FIG. 2, an integral wastewater treatment system 10 includes a vessel 12 having at least one internal baffle 14 dividing the vessel 12 into at least one treatment chamber 16 and at least one settling chamber 18. Settling chamber 18 is defined at least in part by a first surface 20 of the baffle 14. The treatment chamber 16 is defined at least in part by a second surface 22 of the baffle 14 opposite the first surface 20. An influent conduit 24 connects the treatment chamber 16 to a source of wastewater (not shown). A recycle pump 26 is provided for recycling wastewater from the treatment chamber 16 back into the settling chamber 18. An effluent conduit 28 is provided for removing treated wastewater from the settling chamber 18. Baffle 14 has at least one inwardly sloping wall 30 to form a settling chamber throat 32 terminating at a sludge return opening 34 at the bottom of the baffle 14. The sludge return opening 34 is spaced above a bottom surface 36 of the treatment chamber 16, such that sludge settling in the chamber is returned to the treatment chamber 18 at the bottom of the baffle 14.

In the system of FIG. 2, the settling chamber 18, the sludge return opening 34, the effluent conduit 28 and the recycle pump 26 are adapted and arranged such that downward sludge velocity through the sludge return opening 34 is induced in excess of the natural settling velocity induced by gravity alone. In one embodiment of the invention, recycle pump 26 is an air lift pump, and discharges recycle water into a center well 38. The induced downward sludge velocity is illustrated by arrows 40, and such induced downward sludge velocity 40 is preferably in the range of about 20 to about 60 feet per hour, whereas the natural settling velocity induced by gravity alone would be about 0.5 to about 3 feet per hour. In FIG. 2, the treatment system in treatment chamber 16 is a diffused air aeration system 42. It preferably is desirable to induce a horizontal sweep velocity into the flow of return sludge across the bottom 36 of vessel 12 to sweep sludge from the settling chamber throat 32 and sludge return opening 34. When diffused air aeration is used as the treatment mechanism, the horizontal sweep velocity may be induced by way of a differential imbalance arrangement of the diffused air aeration system. A differential imbalance of approximately 5% has been found to be effective in reducing sludge buildups at the throat. Preferably, the horizontal sweep velocity has ratio to the induced downward sludge velocity of about 2:1 to about 15:1.

Figure 5:
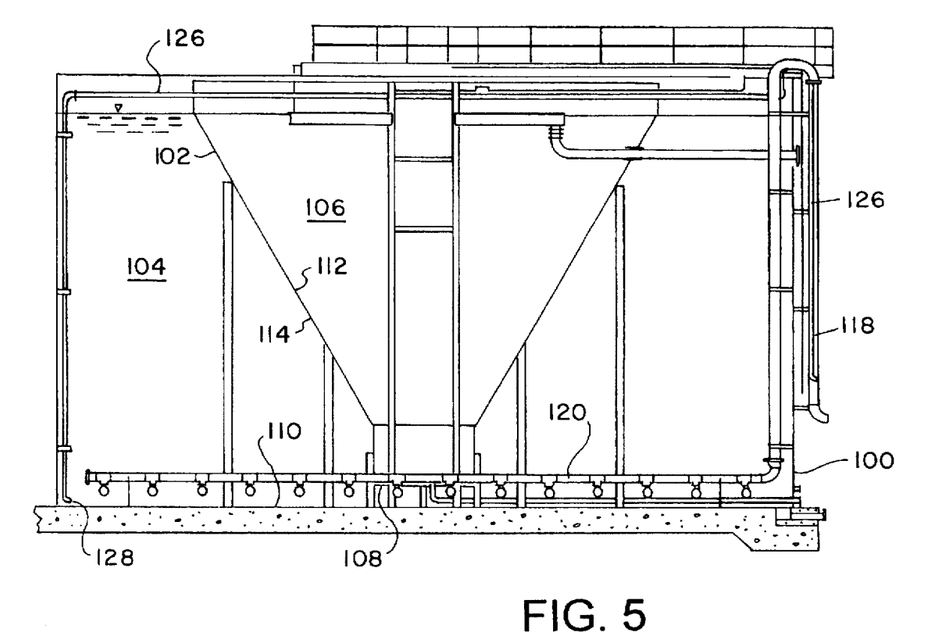
FIG. 5 is a sectional view taken along lines 5—5 of FIG. 4.
Figure 6:
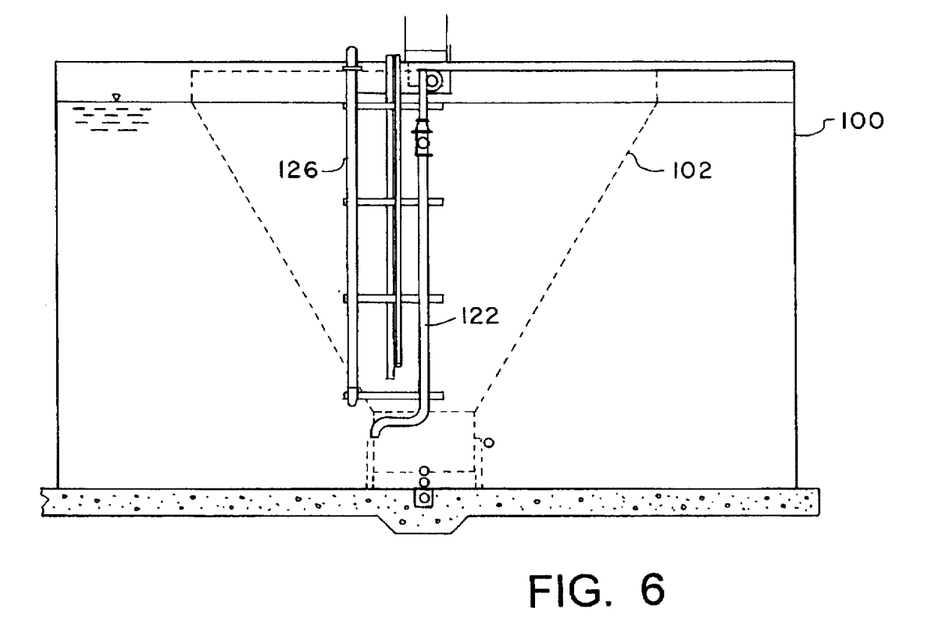
FIG. 6 is a sectional view taken along lines 6—6 of FIG. 4.

Referring now to FIGS. 3–6, where like numerals refer to like and corresponding elements, the system of FIG. 2 may be understood in greater detail by reference to a specific embodiment. A vessel 100 is a large cylindrical tank having baffle 102 supported within the vessel 100. Baffle 102 defines the treatment chamber 104 and the settling chamber 106. Sludge return opening 108 is spaced above the bottom surface 110 of vessel 100, as best shown in FIG. 5. Baffle 102 has inwardly sloping first surface 112 defining settling chamber 106 and second surface 114 defining at least a part of the treatment chamber 104, with the reminder of treatment chamber 104 being defined with interior surfaces of vessel 100.

Blowers 116 (FIG. 4) apply compressed air to a manifold 118 which in turn is connected to a diffused air aeration system 120 (FIG. 5). Blowers 116 also provide compressed air to the air lift recycle pump, which is not shown in detail but well known to persons of ordinary skill in this art . Effluent conduit 122 is supplied by a weir 124 located in the center of settling chamber 106. Influent conduit 126 extends across vessel 100, down one side, and terminates near the bottom surface 110 of the vessel at outlet 128. Additional equipment, not critical to the present invention, is a blend tank 130, a final storage tank 132, a sump 134, chemical additive system 136, and sludge pumps 138.

The key feature of the invention is the induced downward sludge velocity provided by recycle conduit 140, terminating in the center well provided by flume 142. The recycle flow of wastewater is provided by the air lift pump through conduit 140 into center well 142 to induce the downward velocity of sludge, the key to this invention.

While the foregoing description has been of an embodiment having circular horizontal cross-sections, it will be recognized that the invention can equivalently be made in elliptical or rectangular configurations. In addition, while the preferred embodiment has the treatment chamber surrounding the settling chamber, alternatively the baffled vessel can be arranged such that the treatment chamber is in the center and the settling chamber is outside or surrounding the treatment chamber. Similarly the two chambers may be arranged such that they are side by side. Finally, while the described embodiment has an aeration system in the treatment chamber, it will be understood that alternate forms of treatment systems may be utilized, such as anaerobic systems.

Figure 7:
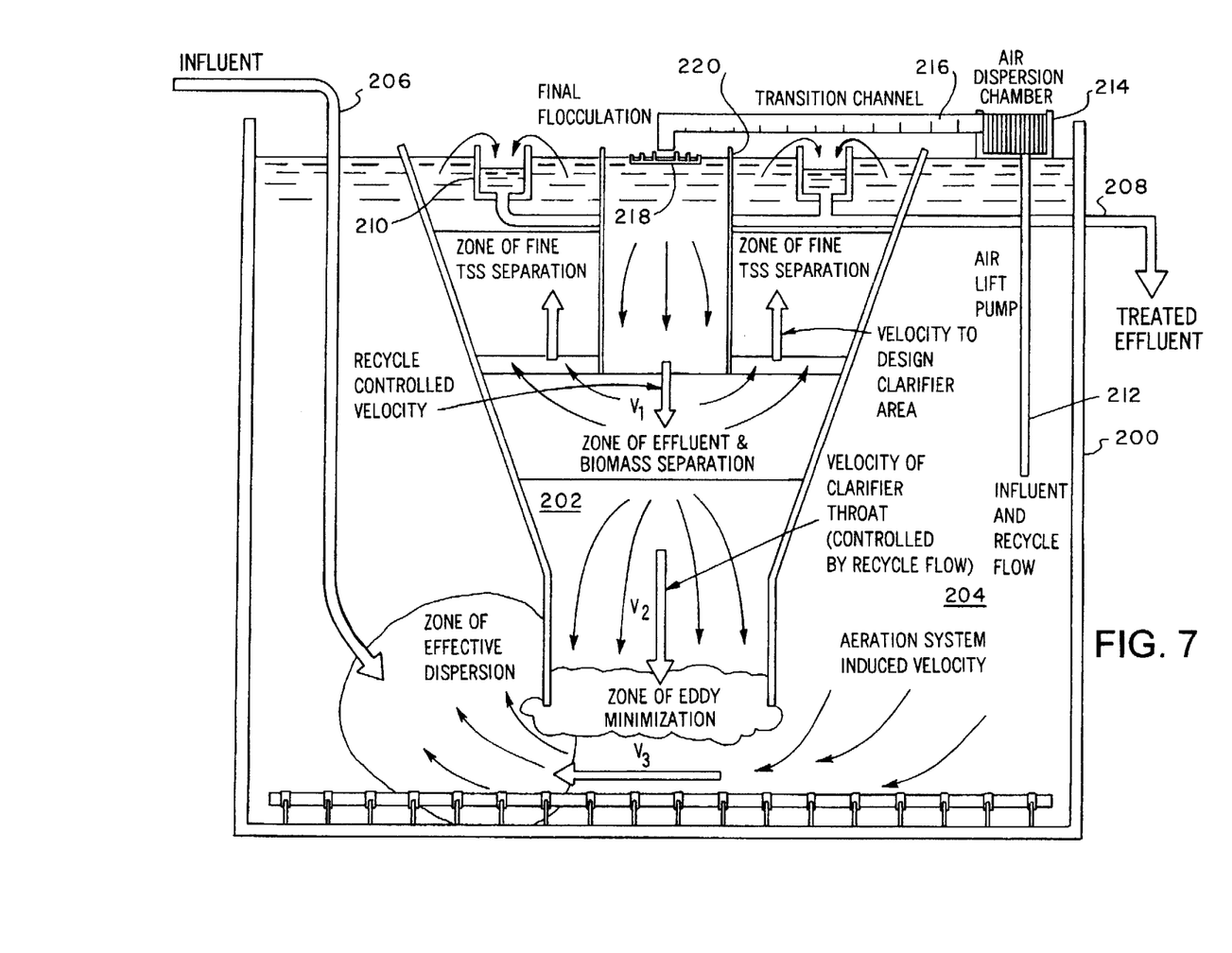
FIG. 7 is a schematic view of the integral activated sludge system in operation.

Referring now to FIG. 7, specific velocities introduced into the sludge flow may be better understood. The vessel 200 is divided into a settling chamber 202 and a treatment chamber 204. Influent enters the treatment chamber through conduit 206, while effluent exits the system through conduit 208. Influent is taken from the top of settling chamber 202 by weir 210. Air lift pump 212 provides recycle flow through air dispersion chamber 214, transition channel 216, and through final flocculation apparatus 218. Recycle flow enters center well 220.

In operation, as best shown in FIG. 7, the induced sludge settling velocity and the withdrawal velocity and dispersion mechanism must be accomplished within precise design limits. The invention integrates four crucial elements shown in FIG. 7:

1. Center Well Velocity ($V_1$) and Clarifier Throat Velocity ($V_2$)

The center well and bottom throat of the clarifier are specifically designed to impart interrelated velocities on, first, the total clarifier effluent flow and recycle stream or Center Well Velocity ($V_1$), and, secondly, the exiting thickened sludge stream or Clarifier Throat Velocity ($V_2$), respectively.

2. Horizontal Sweep Velocity ($V_3$)

An undercurrent directional pattern must be produced to "sweep" the settling, thickened sludge from beneath the clarifier throat into the Zone of Effective Dispersion. This current and its associated velocity ($V_3$) are designed as a function of aeration basin configuration and aeration device type and pattern arrangement.

3. Zone of Eddy Minimization (ZEM)

In order to eliminate the potential of sludge build up in the clarifier throat, backmixing and eddy development are minimized by proper design of the velocities, $V_2$ and $V_3$, and spacing of the clarifier throat bottom from the tank floor.

4. Zone of Effective Dispersion (ZED)

After the sludge is effectively withdrawn from the clarifier throat, the invention insures rapid and complete mixing of the thickened return sludge (Qr), the aerobic or anoxic biomass, and influent raw wastewater (Qi). The ZED can be controlled to be aerobic for immediate equalized biotreatment or anoxic for denitrification or to serve as a "Selector" for control of undesirable filamentous organisms.

The surface area of the clarifier is designed conventionally on upflow velocity, i.e., based on hydraulic overflow rate in meter/hour or gallons per day per square foot (vo) and effluent flow (Qe). However, due to the controlled, induced velocity in the clarifier throat, the conventional surface is only needed for fugitive fine TSS separation. The bulk of the biomass (MLSS) is literally blown back into the aeration basin by the downward, induced velocity. Even poor-settling, filamentous sludges are carried back into the aeration tank without relying on gravity separation.

The specific induced sludge velocities may be calculated based on aeration type:

a. Diffused Air: An intentional imbalance of air input creates the Horizontal Sweep Velocity ($V_3$). Three to ten percent imbalance is normal to generate a Horizontal Sweep Velocity ($V_3$) that is 50 to 150 percent greater than Clarifier Throat Velocity ($V_2$).

b. Surface or Turbine Aerators: Center Well Velocity ($V_1$) is greater than the horizontal bottom velocity created by surface aeration rotation. Downward, exiting velocity needs to be 50 to 150 percent greater than the horizontal bottom velocities.

c. Jet Pumps: Same analysis as for diffused air. The sweep velocity is created by the pump nozzles to create an underflow velocity 50 to 150 percent greater than the downward velocity.

$V_1$ is generally designed for about 20 to about 60 ft/hr downward velocity. $V_2$ will depend on clarifier throat diameter or width. It is intended to blend the downward Clarifier Throat Velocity ($V_2$) with the Horizontal Sweep Velocity ($V_3$) so that sludge is swept from the bottom of the throat at velocities not less than 0.1 ft/min. $V_3$ is designed based on the aeration type as discussed above.

The present invention provides a significant simplification to the conventional activated sludge system by:

1. Providing columnar, vertical separation of biomass and treated effluent as compared with horizontal blanket separation in conventional clarification.

2. Allowing control of vertical velocity without disturbing separation influences.

3. Developing a system with no moving parts within the activated sludge system.

4. Providing simplicity of construction and field installation of the integral components.

Specifically, the system achieves the following key features:

1. No additional structural requirement for the clarifier walls to contain water.
2. No internal mechanism for the clarifier.
3. No sludge return pumps.
4. No mechanical pumping into the clarifier.
5. Aeration grid design and air flow variation, along with clarifier exit design, to generate desired velocity sweep along aeration tank bottom immediately below clarifier bottom.

Finally, the invention provides for maximum operation flexibility to the owners and operators of the system. Consequently, both continuous flow (in complete-mixed and series operation) and sequential batch flow modes have been developed. The preferred embodiment of the invention can operate in any of the following modes without any modification or changes of basic equipment:

1. Continuous-flow Mode a. Completely-mixed operation, single or parallel flow (one or two tank construction).

b. Two stage, single sludge system (one or two tank construction).

c. Two-stage, two-sludge system (one or two tank construction).

d. Two-stage, anoxic-aerobic system for nitrification-dentrification (one tank constitution). This configuration is similar to the one immediately above except for non-aerated, induced mixing in the first stage (anoxic).

2. Batch Flow Mode a. Sequential Batch Reactor (SBR) Operation: Can be operated in the same tank as the complete mix system, as desired, while maintaining aeration during the entire sedimentation cycle, which is impossible in the conventional SBR systems.

b. Can operate the batch cycle in any manner suitable to operator, e.g., infrequently, as needed, for specific industrial campaigns.

3. Powered Activated Carbon (PAC) Addition

It is possible, if desired, to add PAC without capital expenditures or modification to operating procedures. The integral clarifier, combined with the "No Moving Parts" feature, allows upgrade instantaneously.

In addition to the technical advantages mentioned above, the major economic advantages of the system are capital and operating economics inherent with the process. These advantages may be summarized as follows:

1. Structural Capital Economics a. An independent, stand-alone conventional clarifier requires substantial structural support for a hydraulic pressure head of 3 to 5 m (12 to 16 ft).

b. The system of the present invention requires no structural water support because of the equalizing water pressures on the walls of the clarifier within the aeration basin.

2. Mechanical Capital Economics a. The conventional clarifier requires an internal, moving mechanism to collect sludge and channel it to central sludge removal facilities.

b. The conventional clarifier requires at least two, and usually three, sludge return pumps, to accomplish the objectives established by conventional operating procedures.

c. The invention herein requires neither an internal sweeping mechanism nor return sludge pumps to obtain optimum operation of the system.

3. Mechanical Operational Economics a. Conventional clarifiers are a constant, maintenance problem, requiring continual upkeep of the center drive mechanism and repair or preventive maintenance on the sludge return pumps.

b. Conventional clarifiers are high energy consumers in an activated sludge facility with respect to the sludge return pumps. These pumps operate 24 hours per day and each pump is pumping at a rate equal to at least 33 to 50 percent of the In fluent flow to the activated sludge process.

c. The proposed concept avoids these operating and maintenance costs due to elimination of the need for the internal mechanism and the sludge return pumps.

A model comparison of the capital and operating costs of the system of the present invention vs a conventional clarifier and activated sludge process is given below. These costs comparisons were developed for a wastewater with the following characteristics into the activated sludge aeration basin:

Flow=700 gpm
=1.0 mgd

BOD=1,500 mg/L
=4,170 lbs/day
TSS=150 mg/L
=1,251 lbs/day

| Cost Item | Conventional Clarifier | System of the Present Invention |
|---|---|---|
| Clarifier surface area, sq ft | 3,330 | 3,330 |
| Clarifier volume, gal | 372,070 | 205,700 |
| Clarifier depth, ft | | |
| Side water depth | 14 | N/A |
| Depth at center | 17 | 23 |
| Capital Costs | | |
| Structural shell | $150,000 | $60,000 |
| Sludge mechanism | 80,000 | — |
| Sludge return pumps | 50,000 | — |
| Sludge return piping | 20,000 | 15,000 |
| Electrical/Instrumentation | 15,000 | 7,000 |
| Total Capital Costs | $315,000 | $82,000 |

EXAMPLES

Example 1

Example 1 is a comprehensive pilot testing to fully explore the constraints and develop the attributes of the present invention. The pilot testing was conducted in an 8.5 m (28 ft) diameter aeration tank with a 6.1 m (20 ft) depth. The pilot clarifier was 5.5 m (18 ft) in diameter. The aeration system was an "engineered orifice," coarse bubble grid, capable of air flow regimes from 0.2 to 9.3 scu m/min/sq m (0.1 to 0.5 scfm/sq ft). Based on prior premises and beliefs, the following concepts were confirmed and developed during the pilot investigation:

1. Importance of bottom-sweep liquid movement velocities beneath the clarifier.

2. The importance of inducing vertical or cylindrical sludge removal, while allowing for horizontal liquid separation.

3. Control of center well velocities to intentionally control the preceding.

4. Maximization of enhanced biomass flocculation (without chemical addition) prior to entering the center well (see U.S. Pat. No. 5,766,459).

The pilot testing confirmed the following:

1. The utilization of a 60-degree slope on the clarifier walls prevents sludge accumulation and allows free-flowing conditions for the downward-moving biomass. Thus, an internal powered sweeping mechanism was not necessary.

2. Minimal scum accumulation on the surface of the clarifier due to induced removal of scum, concurrent with removal of the sludge, through the clarifier bottom into the aeration basin.

3. Effluent TSS quality is comparable to, if not better than, conventional clarification.

4. Design techniques predict performance of the integral clarification system.

Example 2

The performance of the invention was proven in a full-scale operating Example 2.

The system of Example 2 had the following design characteristics:
PLANT EFFLUENT FLOW (gpm)=185
RECYCLE FLOW (gpm)=550
CENTER WELL AREA (ft$^2$)=31
SLUDGE RETURN OPENING AREA (ft$^2$)=53
SURFACE AREA (ft$^2$)=1066
CENTER WELL VELOCITY $V_1$ (ft/hr)=142
CLARIFIER THROAT VELOCITY $V_2$ (ft/hr)=55
OVERFLOW RATE (gpd/ft$^2$)=250
CLARIFIER DEPTH (ft)=31
PLANT AERATION TYPE=Diffused
HORIZONTAL SWEEP VELOCITY $V_3$ (ft/hr)=390
% IMBALANCE OF AERATION=8

Again the system of the present invention performed as well or better than a conventional system from a clarification standpoint. However, the system was demonstratedly superior to conventional activated sludge based on the capacity to carry higher levels of MLSS in the aeration basin without deleterious consequences in the clarifier.

Examples 3–7

Several additional examples have been developed, having the following characteristics:

| EXAMPLE | EFFLUENT FLOW (gpm) | RECYCLE FLOW (gpm) | CENTER-WELL AREA (ft$^2$) | OUTLET AREA (ft$^2$) | SURFACE AREA (ft2) |
|---|---|---|---|---|---|
| 3 | 138 | 2400 | 24 | 280 | 990 |
| 4 | 347 | 2000 | 252 | 252 | 3330 |
| 5 | 88 | 500 | 15 | 15 | 700 |
| 6 | 364 | 5200 | 800 | 800 | 6680 |
| 7 | 3000 | 6400 | 439 | 400 | 17970 |

| EXAMPLE | CENTER WELL VELOCITY (ft/hr) $V_1$ | CLARIFIER THROAT VELOCITY (ft/hr) $V_2$ | OVERFLOW RATE (gpd/ft$^2$) | CLARIFIER DEPTH (ft) |
|---|---|---|---|---|
| 3 | 802 | 65 | 201 | 10 |
| 4 | 64 | 50 | 150 | 24 |
| 5 | 267 | 62 | 181 | 21.6 |
| 6 | 52 | 46 | 78 | 30 |
| 7 | 128 | 68 | 240 | 28 |

| EXAMPLE | AERATION TYPE | HORIZONTAL SWEEP VELOCITY $V_3$ | % IMBALANCE OF AERATION OR % EXIT VELOCITY OVER BOTTOM VELOCITY |
|---|---|---|---|
| 3 | Surface (Hi Spd) | 400 | 150 |
| 4 | Diffused/Air Lift | 600 | 3 |
| 5 | Diffused | 400 | 8 |
| 6 | Jet Pump | 360 | 90 |
| 7 | Diffused/Jet Pump | 400 | 75 |

Whereas, the present invention has been described with the respect to a specific embodiment thereof, it will be understood that various changes and modifications will be suggested to one skilled in the art, and it is intended to encompass such changes and modifications as fall within the scope of the appended claims.

I claim:

1. An integral wastewater treatment system, comprising:
a vessel having at least one internal baffle dividing the vessel into at least one treatment chamber and at least one settling chamber;

the settling chamber being defined at least in part by a first surface of the baffle;

the treatment chamber being defined at least in part by a second surface of the baffle opposite the first surface;

an influent conduit connecting the treatment chamber to a source of wastewater;

a recycle pump for recycling treated wastewater from the treatment chamber back into the settling chamber;

an effluent conduit for removing treated wastewater from the settling chamber;

a treatment system for treating water in the treatment chamber;

the baffle having at least one inwardly sloping wall to form a settling chamber throat, the settling chamber throat terminating at a sludge return opening at the bottom of the baffle, the sludge return opening being spaced above a bottom surface of the treatment chamber, such that sludge settling in the settling chamber is returned to the treatment chamber at the bottom of the baffle; and with the recycle pump sized such that downward sludge velocity through the sludge return opening is induced in excess of the natural settling velocity induced by gravity alone.

2. The system of claim 1 with means for inducing a horizontal sweep velocity in the flow of return sludge across the bottom of the vessel to sweep sludge from settling chamber throat and sludge return opening.

3. The system of claim 2 with the treatment system being a diffused air aeration system, and the means for inducing a horizontal sweep velocity is a differential imbalance arrangement of the aeration system.

4. The system of claim 3 with the differential imbalance being in the range of approximately 5 percent.

5. The system of claim 2 with the ratio of horizontal sweep velocity to induced downward sludge velocity being in the range of 2:1 to 15:1.

6. The system of claim 1 with the induced downward sludge velocity in the range of about 20 to about 60 feet per hour.

* * * * *